United States Patent [19]
Schaefer et al.

[11] Patent Number: 5,725,897
[45] Date of Patent: Mar. 10, 1998

[54] LOW TEMPERATURE RENDERING PROCESS

[75] Inventors: Daniel L. Schaefer, Maize; M. James Riemann, Derby; Michael E. Rempe, Witchita, all of Kans.

[73] Assignee: Cargill, Incorporated, Minneapolis, Minn.

[21] Appl. No.: 506,612

[22] Filed: Jul. 25, 1995

Related U.S. Application Data

[60] Provisional application No. 60/000,839 Jul. 3, 1995.
[51] Int. Cl.$^6$ ........................................ A23L 1/31
[52] U.S. Cl. ........................ 426/417; 426/478; 426/641
[58] Field of Search .................... 426/417, 641, 426/478, 480; 554/8

[56] References Cited

U.S. PATENT DOCUMENTS

| | | |
|---|---|---|
| 2,467,529 | 4/1949 | Hormel. |
| 2,745,856 | 5/1956 | Dayen et al.. |
| 2,780,968 | 2/1957 | Heys. |
| 3,008,831 | 11/1961 | Christianson. |
| 3,020,160 | 2/1962 | Downing et al.. |
| 3,023,694 | 3/1962 | Burns. |
| 3,058,830 | 10/1962 | Christianson. |
| 3,078,165 | 2/1963 | Alberts. |
| 3,078,287 | 2/1963 | Downing. |
| 3,138,088 | 6/1964 | Foth. |
| 3,141,774 | 7/1964 | Little. |
| 3,177,080 | 4/1965 | Alberts. |
| 3,291,616 | 12/1966 | Brissey. |
| 3,345,353 | 10/1967 | Klubien. |
| 3,346,393 | 10/1967 | Bradford. |
| 3,352,841 | 11/1967 | Lyon. |
| 3,471,299 | 10/1969 | Duckworth et al.. |
| 3,601,039 | 8/1971 | Schover ............................ 100/118 |
| 3,613,564 | 10/1971 | Adamski et al. .................. 100/118 |
| 3,666,499 | 5/1972 | Isnor. |
| 3,780,191 | 12/1973 | Langer et al. .................... 426/231 |
| 3,904,770 | 9/1975 | Hale et al. ........................ 426/645 |
| 3,906,118 | 9/1975 | McFarland ........................ 426/479 |
| 3,979,296 | 9/1976 | Bastgen ............................ 210/324 |
| 4,098,095 | 7/1978 | Roth ................................. 62/346 |
| 4,119,735 | 10/1978 | Maher et al. .................... 426/264 |
| 4,122,208 | 10/1978 | Tronstad ........................... 426/641 |
| 4,137,335 | 1/1979 | Holm et al. ...................... 426/417 |
| 4,156,384 | 5/1979 | Hinds, Jr. et al. ............... 99/459 |
| 4,163,009 | 7/1979 | Filstrup ............................ 260/112 R |
| 4,186,216 | 1/1980 | Roth ................................. 426/480 |
| 4,201,302 | 5/1980 | Roth ................................. 209/577 |
| 4,216,239 | 8/1980 | Gloppestad ...................... 426/456 |
| 4,240,591 | 12/1980 | Schnell. |

(List continued on next page.)

FOREIGN PATENT DOCUMENTS

| | | |
|---|---|---|
| 1044043 | 9/1966 | United Kingdom. |
| 2 264 220 A | 8/1993 | United Kingdom. |
| WO 82/01719 | 5/1982 | WIPO. |
| WO 93/09679 | 5/1993 | WIPO. |

*Primary Examiner*—Arthur L. Corbin
*Attorney, Agent, or Firm*—Merchant, Gould, Smith, Edell, Welter & Schmidt P.A.

[57] ABSTRACT

A low temperature rendering process for converting animal trimmings to a meat product which can be classified as finely textured meat. The low temperature rendering process includes the steps of heating desinewed animal trimmings in a heat exchanger having a first-in and first-out arrangement to provide heating of the desinewed animal trimmings to a temperature in the range of about 90° F. to about 110° F. to form a heated slurry; separating a solids stream and a liquids stream from the heated slurry, the solids stream containing an increased amount of protein and moisture, and the liquids stream containing an increased amount of tallow, water soluble protein, and moisture; separating a heavy phase and a light phase from the liquids stream, the heavy phase containing an increased amount of moisture and water soluble protein, and the light phase containing an increased amount of tallow; and combining the solids stream and the heavy phase to form a meat product.

26 Claims, 1 Drawing Sheet

U.S. PATENT DOCUMENTS

| | | | |
|---|---|---|---|
| 4,294,860 | 10/1981 | Roth | 426/417 |
| 4,331,695 | 5/1982 | Zosel | 426/430 |
| 4,337,627 | 7/1982 | Roth | 62/346 |
| 4,344,976 | 8/1982 | Bladh | 426/472 |
| 4,361,590 | 11/1982 | Wojcik | 426/480 |
| 4,389,423 | 6/1983 | Madsen | 426/417 |
| 4,405,651 | 9/1983 | Entremont et al. | 426/241 |
| 4,567,050 | 1/1986 | Roth | 426/417 |
| 4,759,943 | 7/1988 | Ross, Jr. | 426/646 |
| 4,948,607 | 8/1990 | Margolis | 426/281 |
| 5,041,055 | 8/1991 | Roth | 452/140 |
| 5,082,678 | 1/1992 | Margolis | 426/281 |
| 5,167,977 | 12/1992 | Gamay | 426/417 |
| 5,221,554 | 6/1993 | Gamay | 426/646 |
| 5,232,725 | 8/1993 | Roderbourg et al. | 426/417 |
| 5,382,444 | 1/1995 | Roehrig et al. | 426/646 |
| 5,405,632 | 4/1995 | Mahboob | 426/243 |
| 5,474,790 | 12/1995 | Franklin | 426/417 |
| 5,514,396 | 5/1996 | Mahboob | 426/243 |
| 5,552,173 | 9/1996 | Singh et al. | 426/417 |
| 5,576,047 | 11/1996 | Margolis | 426/646 |

LOW TEMPERATURE RENDERING PROCESS

This application claims priority to provisional patent application Ser. No. 60/000,839, which was filed on Jul. 3, 1995.

FIELD OF THE INVENTION

The present invention relates to a low temperature rendering process and to meat product. More particularly, it concerns recovering meat product from animal trimmings. The meat product has reduced fat content and increased protein and essential amino acid content compared with unprocessed animal trimmings, and can be classified as "finely textured meat."

BACKGROUND OF THE INVENTION

Low temperature rendering processes have been used to separate protein from fatty tissue in animal trimmings. Low temperature rendering processes are described in, for example, U.S. Pat. Nos. 3,008,831; 3,020,160; and 3,078,165. The processes generally involve comminuting fatty tissue from animals, such as hogs or cattle, to form a semi-solid slurry or meat emulsion, heating the slurry or emulsion to melt the fat, and then separating the fat and protein by centrifugation. The protein can then be used as an ingredient in processed meat products such as sausage and other cured and processed meats.

As reported in U.S. Pat. No. 3,219,616 to Brissey, it has been found that the protein or meat provided by prior art low temperature rendering processes suffer from undesirable flavor changes shortly after production. In order to reduce the flavor changes after low temperature rendering processes, this patent teaches using a heme-conditioning agent which reacts or combines with the heme pigments of the meat to reduce the activity of the heme pigments which catalyzes the development of off-flavor.

The government provides that a certain quality of meat product obtained from animal trimmings can be used undeclared in meat products of the same species. For example, "finely textured beef" and "lean finely textured beef" can be used in ground beef without being declared on the label. "Finely textured meat" is required to have a fat content of less than 30%; a protein content of greater than 14%, by weight; a protein efficiency ratio (PER) of 2.5 or higher, or an essential amino acids (EAA) content of 33% of the total amino acids or higher; must be prepared in a federally inspected plant; must not have a product temperature during processing exceeding 110° F.; must be frozen in less than 30 minutes after processing; must not allow a significant increase in bacterial numbers; and must not be treated with chemicals or additives. "Lean finely textured meat" is required to have a fat content of less than 10%, by weight, and complies with the other requirements of "finely textured meat."

SUMMARY OF THE INVENTION

A low temperature rendering process for converting animal trimmings to meat product is provided by the present invention. The low temperature rendering process includes the process steps of: heating desinewed animal trimmings in a heat exchanger having a first-in and first-out arrangement to provide heating of the desinewed animal trimmings to a temperature in the range of about 90° F. to about 120° F. to form a heated slurry; separating a solids stream and a liquids stream from the heated slurry, the solids stream containing an increased weight percent of protein and moisture compared with the weight percent of protein and moisture in the heated slurry, and the liquids stream containing an increased weight percent of tallow compared with the weight percent of tallow in the heated slurry; separating a heavy phase and a light phase from the liquids stream, the heavy phase containing an increased weight percent of moisture and water soluble protein compared with the weight percent of moisture and water soluble protein in the liquids stream, and the light phase containing an increased weight percent of tallow compared with the weight percent of tallow in the liquids stream; and combining the solids stream and the heavy phase to form a meat product. Preferably, the meat product has a fat content of less than 30%; a protein content of greater than 14%; and a protein efficiency ratio of 2.5 or higher, and an essential amino acids content of at least 33% of the total amino acids.

In a preferred embodiment, the animal trimmings are processed in closed environment so that atmospheric oxidation is reduced. In addition, the animal trimmings are preferably not heated above 110° F. in the heat exchanger, and are not treated with chemicals or additives.

The step of separating a solids stream and a liquids stream from the heated slurry can occur in a decanter, and the step of separating a heavy phase and a light phase from the liquids stream can occur in a centrifuge, and the meat product can be frozen within about 30 minutes of heating the desinewed animal trimmings in a heat exchanger. The meat product prepared by the low temperature rendering process is preferably finely textured meat. Preferably, the low temperature rendering process is continuous, but can be modified for batch or semi-batch operations.

A finely textured meat product prepared by low temperature rendering is provided by the present invention. The meat product preferably has a fat content of between about 1 and 10% by weight, a protein content of between about 18 and 21% by weight, a moisture content of between about 72 and 77% by weight, and an essential amino acids content of greater than 33% by weight. More preferably, the meat product has a fat content of between about 2 and 7% by weight. In particular, the finely textured meat product can have a color which closely resembles uncooked lean meat. Accordingly, the color can be pink to red.

DETAILED DESCRIPTION OF THE INVENTION

Figure 1:
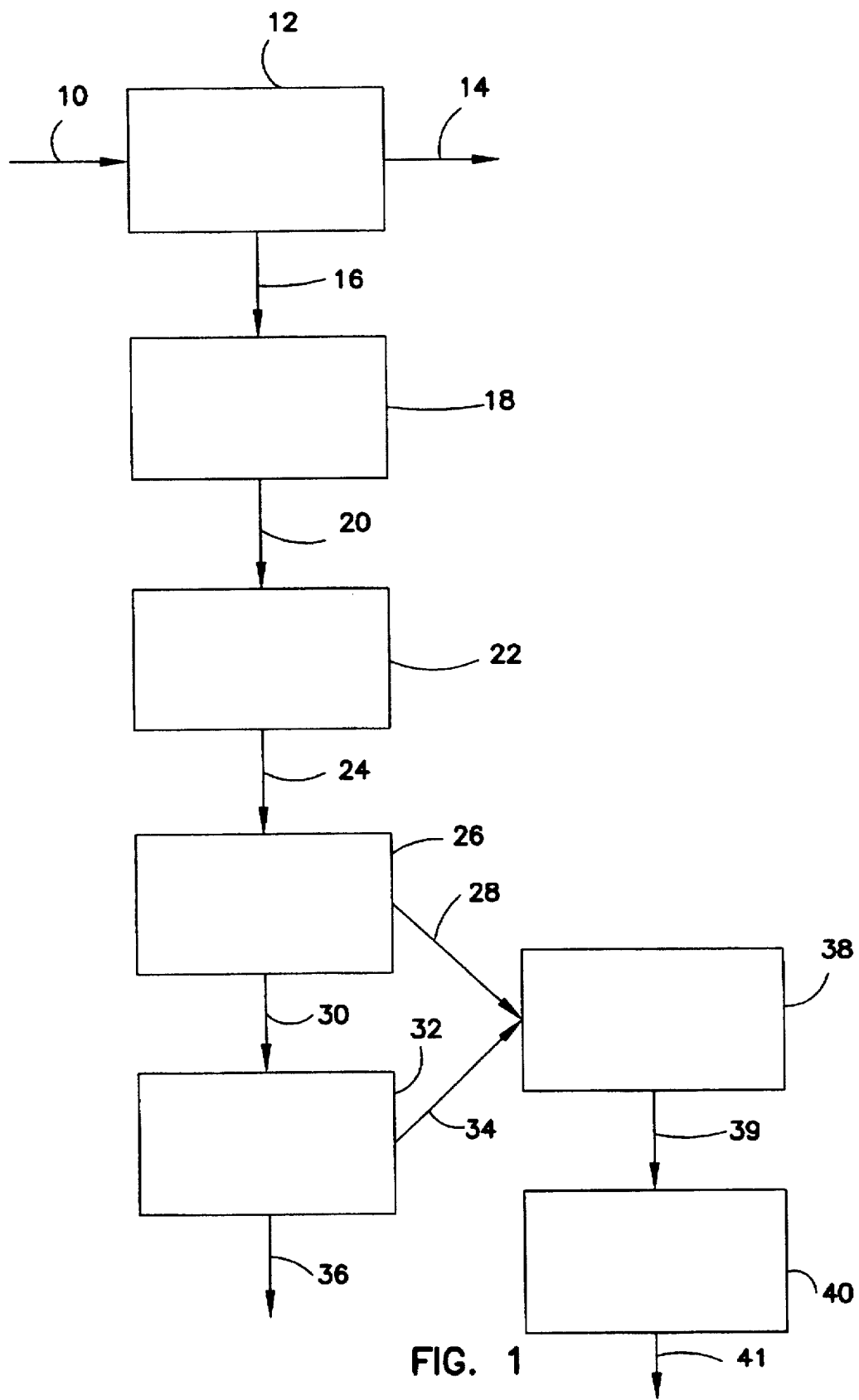
FIG. 1 is a flow diagram illustrating one embodiment of the low temperature rendering process according to the present invention.

The present invention relates to a method for processing animal trimmings to recover meat product low in fat content and high in protein and essential amino acid content. It should be kept in mind that "meat product" describes protein-containing product which is suitable for human consumption as meat because it contain a certain amount of protein. Generally, "animal trimmings" refers to the tissue cut away from conventional cuts or parts of the carcasses of meat producing animals during butchering operations in packing houses and the like. The conventional cuts or parts are generally sold directly to consumers or further processed by, for example, grinding into ground beef. The tissue remaining after the conventional cuts are removed, or after the conventional cuts have been further trimmed, generally has a fat content which is too high for human consumption as meat, but contains protein which can be recovered.

According to the present invention, once the animal trimmings are removed from the carcasses, they are preferably forwarded directly to the low temperature rendering process of the present invention. Alternatively, the animal trimmings can be cooled and stored prior to processing. The temperature of the animal trimmings upon removal from the carcasses is usually about 40° F. which corresponds to the temperature at which the carcasses are stored prior to butchering. Warmer or cooler animal trimmings can be used in the low temperature rendering process of the present invention. It is anticipated that in the future, regulations will allow carcasses to be butchered immediately after removal of the hide, thereby foregoing cooling and storing the carcasses. This will provide warmer animal trimmings which will reduce subsequent heating costs. As will be apparent from the following description, it is important to control the temperature of the processing material throughout the low temperature rendering process of the present invention.

The animal trimmings can include any part of an animal which is trimmed away from the carcass of the animal or the cuts. The animal trimmings can include all the parts normally found in an animal, including adipose tissue, fat, lean, ligaments, tendons, bone parts, and the like. It is generally desirable that if components other than fat, lean, and moisture are present, they are present in small quantities and/or can be removed in the desinewing step or by hand, if desired, or can be left therein if their presence does not adversely effect the properties of the meat product. If large amounts of certain components are present, it may be desirable to have them removed by conventional separation techniques prior to processing according to the present invention. For example, it is generally desirable not to have large amounts of bone present or large amounts of low quality ligaments.

It should be kept in mind that "meat producing animals" includes animals which are known to provide meat. Such animals include beef, pork, poultry, lamb, deer, fish, and the like. The lean material can be referred to as protein-containing material, and can be in the form of water soluble protein which tends to give the meat its color, salt soluble protein which include muscle fiber, and nonsoluble protein which are generally the connective tissue which surrounds muscle fiber and which attach the muscle fibers to ligaments. Of particular interest for purposes of the present invention is the presence of the water soluble protein and the salt soluble protein in the fatty tissue within the fat trimmings. By separating this material from the animal trimmings, a high quality meat product can be provided.

Animal trimmings which can be used in the present invention preferably have an average fat content of between about 50 and 80% by weight, and more preferably between about 60 and 70% by weight. The lean content of the animal trimmings is preferably between about 20 and 50% by weight, and more preferably between about 30 and 40% by weight. In order to ensure reliable and consistent results, it is preferable that the lean content of the animal trimmings is at least 37% by weight, and even more preferably at least 39% by weight. It should be kept in mind that the lean content includes protein and moisture.

It is an advantage of the present invention that high quality meat product can be obtained without adding chemicals or additives to the animal trimmings at any time during the processing thereof. In particular, no water or preservative needs to be added during the method of the present invention in order to provide a meat product having a high moisture and protein content and a low fat content. The process steps provided by the following description can be referred to as a closed system since the animal trimmings can be processed without being exposed to the atmosphere and since nothing is added to the animal trimmings during processing. By limiting access to the atmosphere, oxidation of the meat can be limited thereby reducing or eliminating off flavors.

A preferred embodiment of the invention is described in reference to FIG. 1 which provides a diagrammatic illustration of a continuous low temperature rendering process for converting animal trimmings to meat product. It should be appreciated that the method of the invention can be adapted to handle a wide range of throughput rates of animal trimmings. It is particularly desirable for the process to handle the supply of animal trimmings as they are generated in a packing house. For purposes of the following description of a preferred embodiment, beef trimmings containing an average of 61% by weight fat can be processed at a rate of 167 lbs./min. according to the present invention.

Boneless beef trimmings 10 at approximately 40° F. are fed to a desinewing apparatus 12 which removes the heavy connective tissue, ligaments, tendons, and the like if they are present. This is referred to as the desinewing step which separates the low quality protein fraction (sinew) from the high quality protein fraction (skeletal muscle). The sinew 14 is discarded, and the desinewed beef trimmings 16 is subsequently processed to remove fat. The desinewing apparatus 12 is preferably a commercially available Simo Industries 290/125-7PX Pump Deboner modified to include a screen having 0.5 mm rectangular openings to remove heavy connective tissue.

The desinewing step may or may not remove all of the connective tissue. Generally, the desinewing step removes a large amount of the low quality protein component from the animal trimmings. For the above exemplary embodiment, the desinewing step removes 12.9 lbs./min. of sinew and causes the beef trimmings to increase in temperature to about 46°–48° F. The desinewing step is preferably fairly quick and, for the above exemplary embodiment, takes less than one minute for a given volume of animal trimmings. In addition to removing sinew, the desinewing step reduces the viscosity of the animal trimmings which facilitates flow thereof through a pipe.

By separating the sinew 14 from the beef trimmings 16, the proportion of essential amino acids to total amino acids in the final meat product can be increased. Accordingly, it should be appreciated that the essential amino acids content and the protein efficiency ratio of the final meat product can be adjusted, as desired, based upon the desinewing step.

The desinewed beef trimmings 16 are fed to a heat exchanger 18 and heated to about 108° F. to melt the fat. The fat component of the desinewed beef trimmings 16 generally begins to melt at about 92° F., and becomes almost liquid at about 108° F. when it exits the heat exchanger 18 as liquified desinewed beef trimmings 20. The dimensions of the heat exchanger should be sufficient to provide liquified desinewed beef trimmings without significantly cooking or denaturing the protein. In the above exemplary embodiment, the heat exchanger 18 is a jacketed pipe, 2–3 inches in diameter and approximately 900 feet long with water introduced at 115° F. circulating in the jacket to heat the desinewed meat, and the beef trimmings experience a residence time in the jacketed pipe heat exchanger 18 of about 14 to 16 minutes. It should be appreciated that a shorter heat exchanger could be used. However, a shorter heat exchanger may require warmer water in the jacket to provide sufficient heating. If the water is too warm, the risk of overheating the desinewed beef trimmings increases. For example, a heat exchanger about 300 feet long may require water entering the jacket at about 145° F. which could, on occasion, result in overheating.

The heat exchanger 18 can be described as having a first-in and first-out arrangement. This means that substantially all of the desinewed beef trimmings are processed in the heat exchanger for about the same length of time. In other words, the desinewed beef trimmings flow through the heat exchanger without significant amounts remaining in the heat exchanger for extended periods of time compared with similarly processed desinewed beef trimmings. This ensures that the beef trimmings are consistently heated and that certain fractions of the beef trimmings do not remain in the heat exchanger too long resulting in denaturing or cooking thereof. In addition, first-in and first-out processing reduces potential bacterial buildup which would otherwise occur in animal trimmings heated for an extended period of time. It should be appreciated that this type of processing is advantageous over prior art vat or kettle-type heat exchangers which allow certain portions of beef to remain therein for too long. In addition, many prior art vat or kettle-type heat exchangers are open to the atmosphere which allows the beef to be oxidized, resulting in deterioration thereof.

It should be appreciated that the entire low temperature rendering process can be substantially a first-in and first-out arrangement and can be substantially closed from the atmosphere. Certain steps in the process, however, may not be completely first-in and first-out. For example, during centrifuging, portions of the separation stream may remain in the separator for slightly longer periods of time. These separators, however, are preferably designed to provide first-in and first-out operation. Since, the entire low temperature rendering process of the present invention can be enclosed, the extent of oxidation can be reduced, and bacterial growth and contamination can be reduced. Furthermore, by processing the animal trimmings in a first-in and first-out arrangement, it is possible to reduce or eliminate portions of the processing material which is subjected to extended heating or processing.

The liquified desinewed beef trimmings 20 leaves the heat exchanger at a temperature of about 108° F. in the form of a slurry, and is fed into a particle reducer 22 where the particle sizes in the slurry are reduced to form a dispersion 24 having a roughly uniform consistency. The particle reducer 22 can be a Commitrol particle reducer manufactured by Urschel Laboratories Co.

The dispersion 24 is fed to a decanter 26 which provides for solids/liquids separation into a decanter solids stream 28 containing an increased weight percent of protein and moisture compared with the dispersion 24, and a decanter liquids stream 30 containing an increased weight percent of tallow, water soluble protein, and moisture compared with the dispersion 24. It should be appreciated that in the context of this invention, the use of the phrase "an increased amount" refers to an increased weight percentage of a particular component relative to the weight percentage of that component prior in the stream prior to being subjected to a separation step.

In the above exemplary embodiment, the decanter 26 is a CA-405 Decanter sold by Westfalia Separator AG, modified to provide a bowl which is designed to accommodate a high solids load, and which has a soft stream inlet to reduce shearing. The soft stream inlet is preferable since it reduces the amount of shear which would cause protein and fat to emulsify thereby reduce separation of fat and protein. Thus, the soft stream inlet is designed to accelerate the stream to about the same speed as the mass in the decanter prior to mixing. In addition, the overall design of the decanter 26 should provide for sanitary processing, which includes sanitary and accepted construction materials, first-in and first-out processing, and "clean in place" capabilities.

The decanter liquids stream 30 containing an increased amount of tallow, water soluble protein, and moisture is subjected to liquid/liquid separation in a separator 32 to provide a separator heavy phase stream 34 containing an increased amount of moisture and water soluble protein, and a separator light phase stream 36 containing an increased amount of tallow. The separator 32 is preferably a Westfalia RSD 300-96-777 Clarifier, sold by Westfalia Separator AG, which is modified so that the bottom disk is slightly reduced in diameter. Alternatively, the separator can be a Westfalia RSA-450 Separator modified to provide a disc stack to accommodate a higher solids load, or a Westfalia MSD-60 Clarifier. It is believed that the Westfalia RSD 300-96-777 Clarifier provides a greater degree of separation and is capable of handling a greater total processing volume.

The separator heavy phase stream 34 is combined with the decanter solids stream 28 at a mixing point 38 to form a finished product 39 having low fat content and a high essential amino acid content. The separator light phase stream 36 can be further processed to provide an edible rendering which can be referred to as edible tallow. This usually involves removing moisture therefrom using additional heating and centrifugation.

It should be appreciated that the separation steps of the present invention do not provide complete or total separation of protein and fat, or of solids and liquids, etc. Accordingly, it is believed that each stream from a separation step contains a greater (or increased) amount of certain components and a lesser (or decreased) amount of other components.

The finished product 39 is quickly frozen on a freeze apparatus 40 which can be a Freeze Wheel System sold by Reno Technology. The frozen beef product 41 is then packaged for storage or sale. Alternatively, the beef product can be combined with other beef to provide ground beef.

The total time for processing through the low temperature rendering process of the present invention is preferably less than 30 minutes (from desinewing to freezing), and more preferably less than 25 minutes.

For the above exemplary embodiment where beef trimmings containing an average fat content of 61% by weight are fed into the above described low temperature rendering process at a rate of about 167 lbs./min., about 44 lbs./min of frozen beef product can be obtained. This corresponds with a production rate of about 13 lbs./min. of sinew, and about 109 lbs./min of tallow to rendering. The separation steps provide a decanter solids stream of about 28 lbs./min, and a heavy phase of about 17 lbs./min. The content of the various streams throughout the above-described low temperature rendering process are provided in Table 1.

TABLE 1

|  | Fat % | Moisture % | Protein % | EAA % |
| --- | --- | --- | --- | --- |
| Decanter Solids | 7.79 | 66.47 | 25.06 | 29.75 |
| Decanter Liquids | * | 19.79 | * | * |
| Separator Heavy Phase | 1.08 | 88.86 | 8.16 | 41.3 |
| Separator Light Phase | * | .78 | * | * |
| Finished Product | 3.74 | 75.91 | 19.66 | 34.8 |

* Sample not analyzed for

Applicants believe that an important aspect of the invention is the step where the decanter solids stream containing an increased amount of moisture and protein is combined with the separator heavy phase containing an increased amount of moisture and water soluble protein to provide a meat product. As demonstrated by the data in Table 1, this step increases the essential amino acid content while further decreasing the fat content compared to the decanter solids stream. In addition, this step provides a fat content of less than 30% by weight; a protein content of greater than 14% by weight; a protein efficiency ratio (PER) of 2.5 or higher; and an essential amino acids (EAA) content of 33% of the total amino acids or higher. Advantageously, it is possible to provide a fat content of less than 20% by weight, more preferably less than 10% by weight, even more preferably between about 1 and 7% by weight, and most preferably between about 2 and 5% by weight. In addition, it is possible to provide a protein content of preferably greater than 18% by weight, and more preferably greater than 20% by weight.

For processing beef trimmings according to the present invention, it is believed that the preferred content, by weight, of fat, moisture, and protein at the stages of separation for the decanter and separator, and for the final product, are provided in Table 2. It is additionally believed that pork trimmings can be processed to provide the same ranges of fat, moisture and protein.

TABLE 2

| | Fat % | Moisture % | Protein % | EAA |
| --- | --- | --- | --- | --- |
| Decanter Solids | 4.5 to 8.5 | 63 to 69 | 22 to 26.5 | 28.5 to 31 |
| Decanter Liquids | | 16 to 24 | | |
| Separator Heavy Phase | .75 to 2.0 | 86 to 92 | 6 to 9.5 | 39.5 to 42.5 |
| Separator Light Phase | | .15 to 2.0 | | |
| Finished Product | 1 to 7 | 72 to 77 | 18 to 21 | >33% |

The starting material for use in the present invention is preferably boneless beef or pork trimmings. It should be understood, however, that the present invention could be applied to animal trimmings containing undesirable components such as bone, cartilage, etc. In particular, it may be helpful to remove the undesirable components at some stage during the process. An apparatus for separating meat and bone which could be used in accordance with the present invention is described in U.S. Pat. No. 4,186,216 to Roth.

It is noted that it is desirable to quickly cool the protein to prevent deterioration. Certain government regulations require that the protein product be reduced to below 40° F. within one-half hour of its separation from fat. To achieve optimum inhibition of bacteria growth, the product should be lowered to a temperature of from 0° to 10° F. It is an advantage of the present invention that the method can be practiced without raising the temperature of the processed meat above about 110° F. and provides a frozen final product within about 30 minutes of processing. A refrigeration apparatus which can be used in the present invention is described by U.S. Pat. No. 4,098,095 to Roth, the disclosure of which is incorporated herein by reference.

The finely textured meat of the present invention can be used in ground beef without having to be declared on the label, and can be used, if desired, in additional products such as beef patties, sandwich steaks, taco filling, pizza topping, chili, beef sticks, ethnic entrees, meatballs, luncheon meat, fabricated roast beef, pepperoni, and the like.

While the invention has been described in conjunction with specific embodiments thereof, it is evident that different alternatives, modifications, variations, and uses will be apparent to those skilled in the art in view of the foregoing description. Accordingly, the invention is not limited to these embodiments or apparatus presented herein.

What is claimed is:

1. A low temperature rendering process for converting animal trimmings to a meat product, said low temperature rendering process consisting essentially of the steps of:
   (a) heating animal trimmings having an average lean content of less than 39% by weight in a heat exchanger having a first-in and first-out arrangement to a temperature in the range of about 90° F. to about 120° F. to form a heated slurry;
   (b) separating a solids stream and a liquids stream from the heated slurry, the solids stream containing an increased weight percent of protein and moisture compared with the weight percent of protein and moisture in the heated slurry;
   (c) separating a heavy phase and a light phase from the liquids stream, the heavy phase containing an increased weight percent of moisture and water soluble protein compared with the weight percent of moisture and water soluble protein in the heated liquids stream;
   (d) combining the solids stream and the heavy phase to form a meat product; and
   (e) freezing the meat product.

2. The low temperature rendering process according to claim 1, wherein said step of separating a solids stream and a liquids stream from the heated slurry is provided by a decanter.

3. The low temperature rendering process according to claim 1, wherein said step of separating a heavy phase and a light phase from the liquids stream is provided by a centrifuge.

4. The low temperature rendering process according to claim 1, wherein said meat product has a fat content of less than about 30%; a protein content of greater than about 14%; and a protein efficiency ratio of about 2.5 or higher.

5. The low temperature rendering process according to claim 1, wherein said meat product has an essential amino acids content of at least 33% of the total amino acids.

6. The low temperature rendering process according to claim 1, wherein the animal trimmings are not heated above 110° F. in the heat exchanger.

7. The low temperature rendering process according to claim 1, wherein the meat product is frozen within about 30 minutes of said step of heating animal trimmings in a heat exchanger.

8. The low temperature rendering process according to claim 1, wherein the meat product is finely textured meat.

9. The low temperature rendering process according to claim 1, wherein the animal trimmings have a lean content of less than 37% by weight.

10. The low temperature rendering process according to claim 1, wherein the animal trimmings of step (a) are desinewed animal trimmings.

11. The low temperature rendering process according to claim 1, wherein the meat product resulting from step (e) is a frozen meat product.

12. The low temperature rendering process according to claim 1, wherein the meat product is frozen within about 25 minutes of said step of heating animal trimmings in a heat exchanger.

13. A low temperature rendering process for converting animal trimmings to a meat product, said low temperature rendering process consisting essentially of the steps of:
   (a) heating animal trimmings in a heat exchanger having a first-in and first-out arrangement to a temperature in the range of about 90° F. to about 120° F. to form a heated slurry;

(b) separating a solids stream and a liquids stream from the heated slurry, the solids stream containing an increased weight percent of protein and moisture compared with the weight percent of protein and moisture in the heated slurry;

(c) separating a heavy phase and a light phase from the liquids stream, the heavy phase containing an increased weight percent of moisture and water soluble protein compared with the weight percent of moisture and water soluble protein in the heated liquids stream;

(d) combining the solid stream and the heavy phase to form a meat product having a fat content of between 5 and 30% by weight; and (e) freezing the meat product.

14. The low temperature rendering process according to claim 13, wherein said meat product has a fat content of between 5 and 20% by weight.

15. The low temperature rendering process according to claim 13, wherein said meat product has a fat content of between 5 and 7% by weight.

16. The low temperature rendering process according to claim 13, wherein the animal trimmings have an average lean content of less than 37% by weight.

17. The low temperature rendering process according to claim 13, wherein the animal trimmings of step (a) are desinewed animal trimmings.

18. The low temperature rendering process according to claim 13, wherein the meat product resulting from step (e) is a frozen meat product.

19. The low temperature rendering process according to claim 18, wherein the meat product is frozen within about 25 minutes of said step of heating animal trimmings in a heat exchanger.

20. A low temperature rendering process for converting animal trimmings to a meat product, said low temperature rendering process consisting essentially of the steps of:

(a) heating animal trimmings having an average lean content of between 30 and 40% by weight in a heat exchanger having a first-in and first-out arrangement to a temperature in the range of about 90° F. to about 120° F. to form a heated slurry;

(b) separating a solids stream and a liquids stream from the heated slurry, the solids stream containing an increased weight percent of protein and moisture compared with the weight percent of protein and moisture in the heated slurry;

(c) separating a heavy phase and a light phase from the liquids stream, the heavy phase containing an increased weight percent of moisture and water soluble protein compared with the weight percent of moisture and water soluble proteins in the heated liquids stream;

(d) combining the solids stream and the heavy phase to form a meat product; and (e) freezing the meat product.

21. A low temperature rendering process according to claim 20, wherein the animal trimmings of step (a) are desinewed animal trimmings.

22. The low temperature rendering process according to claim 20 wherein the meat product resulting from step (e is a frozen meat product.

23. A low temperature rendering process comprising the steps of:

(1) removing animal trimmings from an animal carcass; and (2) converting said animal trimmings to a meat product by a process consisting essentially of the steps of:

(a) heating animal trimmings having an average lean content of less than 39% by weight in a heat exchanger having a first-in and first-out arrangement to a temperature in the range of about 90° F. to about 120° F. to form a heated slurry;

(b) separating a solids stream and a liquids stream from the heated slurry, the solids stream containing an increased weight percent of protein and moisture compared with the weight percent of protein and moisture in the heated slurry;

(c) separating a heavy phase and a light phase from the liquids stream, the heavy phase containing an increased weight percent of moisture and water soluble protein compared with the weight percent of moisture and water soluble proteins in the heated liquids stream;

(d) combining the solids stream and the heavy phase to form a meat product; and (e) freezing the meat product.

24. The low temperature rendering process according to claim 23, further comprising a step of removing connective tissue from animal trimmings to provide desinewed animal trimmings.

25. The low temperature rendering process according to claim 23, further comprising a step of packaging the meat product obtained from step (e).

26. A low temperature rendering process comprising the steps of:

(1) removing animal trimmings from an animal carcass; and (2) converting the animal trimmings to a meat product by a process consisting essentially of the steps of:

(a) heating animal trimmings in a heat exchanger having a first-in and first-out arrangement to a temperature in the range of about 90° F. to about 120° F. to form a heated slurry;

(b) separating a solids stream and a liquids stream from the heated slurry, the solids stream containing an increased weight percent of protein and moisture compared with the weight percent of protein and moisture in the heated slurry;

(c) separating a heavy phase and a light phase from the liquids stream, the heavy phase containing an increased weight percent of moisture and water soluble protein compared with the weight percent of moisture and water soluble proteins in the heated liquids stream;

(d) combining the solid stream and the heavy phase to form a meat product having a fat content of between 5 and 30% by weight; and (e) freezing the meat product.

* * * * *